April 22, 1947.  W. A. LIGHTOWLER  2,419,408

CRANKSHAFT

Filed Nov. 14, 1944  2 Sheets-Sheet 1

INVENTOR:
William Arthur Lightowler
by Walter S. Blenton
ATTORNEY

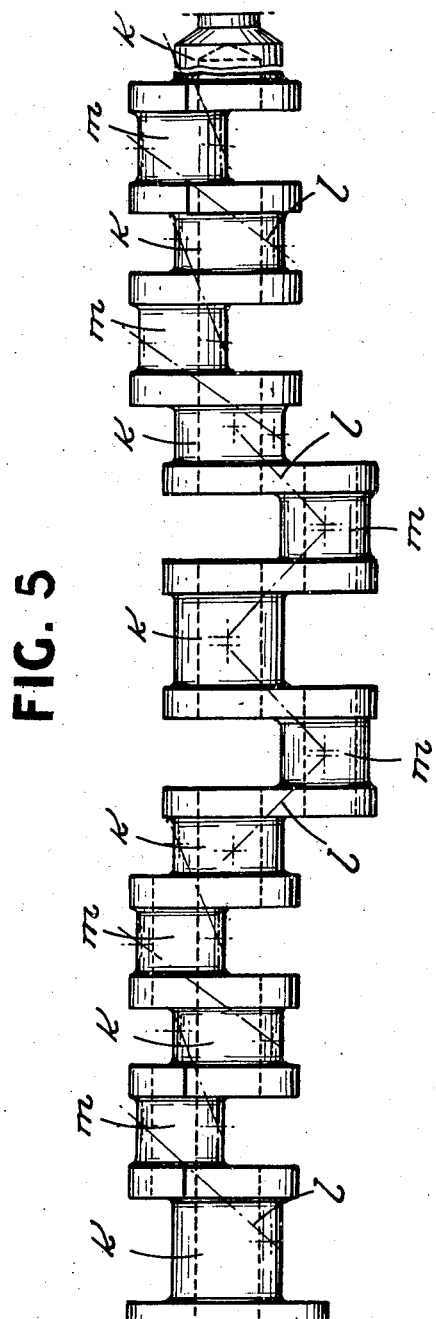

Patented Apr. 22, 1947

2,419,408

UNITED STATES PATENT OFFICE 2,419,408

CRANKSHAFT

William Arthur Lightowler, Coventry, England, assignor to The Maudslay Motor Company Limited, Coventry, England Application November 14, 1944, Serial No. 563,341
In Great Britain November 15, 1943

3 Claims. (Cl. 74—605)

This invention relates to improvements in crankshafts for engines, pumps and other machines.

One of the difficulties in the design of a machine incorporating a crankshaft, and particularly internal combustion engines having multi-throw crankshafts, is the feeding of lubricating oil to the crank-pins or connecting rod journals and big-end bearings. In some cases communicating axial and radial passages are drilled in the journals and crank-webs, the unused ends of the passages being plugged, while in other cases straight oil passages are drilled through the journals and webs to connect directly the journal surfaces, said drillings lying in the common axial plane of the journals. In either case the oil passages are of considerable length.

According to my invention oil-ways or passages are drilled as straight drillings on a compound angle directly between a crank-pin or connecting-rod journal and an adjacent main journal, the drillings passing through the neutral axis of the crank-webs or flanges. The fact that an oilway can be drilled in a straight line from the surface of a crank-pin journal to the adjacent main journal and across the common axial plane is not readily apparent from an elevation or cross-section of a crankshaft but can be appreciated by considering the crankshaft in three dimensions. According to the invention an oil-way or passage is formed as a straight drilling directly between a crank pin or connecting rod journal and an adjacent main journal so as to connect points in these journal surfaces which are on opposite sides of the common axial plane of the two journals, said drilling passing through the crank web or flange.

Further, the operation of drilling the oil-ways is not affected by the presence of balance weights on the crankshaft. The drillings can be started from either end according to the layout of the crankshaft but usually it will be more convenient to start the drillings from the crank-pin end.

In a crankshaft having a main bearing between each crank an oil-way may extend from each crank-pin to each of the adjacent main journals so that there is a double oil-feed to the crank-pin.

Oil can be fed under pressure to each main bearing by a stationary pipe and the oil will be carried through the oil-ways in the crankshaft direct to the adjacent big-end bearing or bearings.

Annular grooves may be provided if desired in the main journals or in the bearings in communication with the oil feed to the bearing so that the oil-ways in the crankshaft are in continuous communication with the oil feed and there is a continuous supply of oil under pressure to the big-end bearing.

Some practical embodiments of my invention are illustrated diagrammatically by way of example in the accompanying drawings in which:

Figure 5 is a plan of a crankshaft for a six-cylinder engine.

Figure 1:
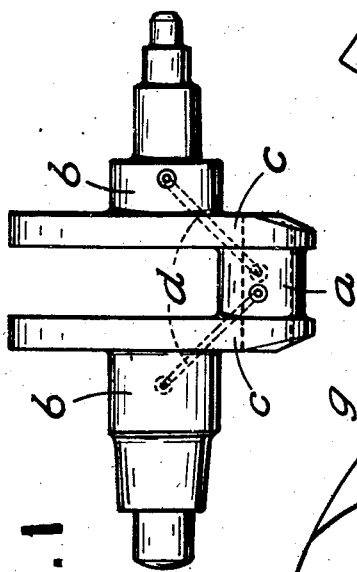
Figure 1 is a plan of a single-throw crankshaft embodying my invention.
Figure 4:
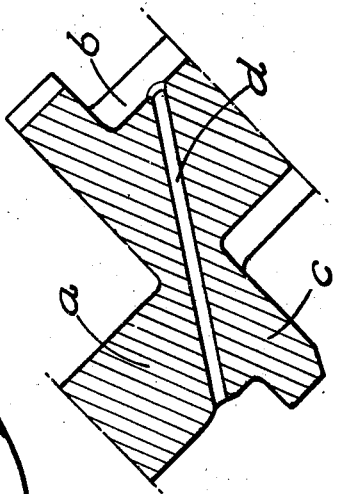
Figure 4 is a fragmentary section of the crankshaft taken on the axis of one of the oil-ways.

Figure 1 shows a simple form of single-throw crankshaft having a crank-pin $a$, main journals $b$, and crank-webs or flanges $c$. A straight oilway or passage $d$ is drilled at an angle between the surface of each journal $b$ and the surface of the crank-pin $a$ so as to connect directly points in these surfaces which are on opposite sides of the common axial plane of the two journals, these oil-ways passing through the crank-webs. The drilling can be done in an ordinary drilling machine while the shaft is held in a jig. As the drilling is inclined at a substantial angle to the surface in which it starts it may be desirable first to mill in the surface a shallow recess of which the base is at right angles to the axis of the drilling as indicated in Figure 4.

If desired an oil-way may be drilled from only one of the main journals to the crank-pin but it is usually preferable to provide an oil-way from each of the two journals as shown in Figure 1 so that there is an adequate supply of oil to the crank-pin and no risk of failure of the supply if one oil-way should become choked.

The angles at which the oil-ways are drilled are such that they are spaced at all points in their length from the axes of the journals and crank-pin so that the oil-ways can be provided whether the shaft is solid or hollow.

Figure 2:
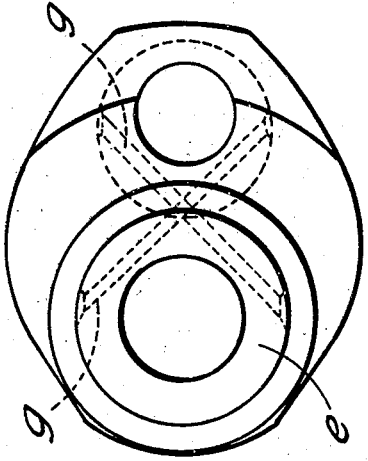
Figure 2 is an end elevation on a larger scale of a crankshaft having a hollow crank-pin and journals.

Figure 2 shows in end elevation a crankshaft having a hollow journal $e$ and a hollow crank-pin $f$. The oil-ways are shown at $g$, $g$.

Figure 3:
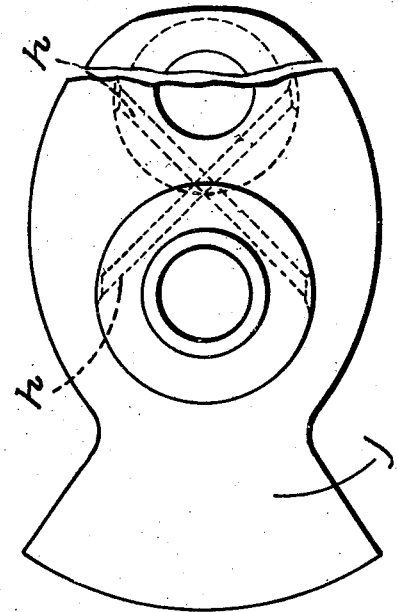
Figure 3 is a similar end elevation showing a crankshaft incorporating a balance weight.

Figure 3 is a similar view showing oil-ways $h$, $h$ in a crankshaft having balance weights $j$.

Figure 5 shows the application of the invention to a six-throw crankshaft having seven main journals $k$. Oil-ways as indicated by the lines $l$ are drilled between each crank-pin $m$ and the journal on each side of it.

My improved arrangement of oil-ways has many advantages in practice.

The oil-ways are reduced to the shortest possible length so that there is a minimum drop in the oil pressure and a minimum rise in the temperature of the oil before it reaches the big-end bearings, and when the engine is started from cold the oil reaches the big-end bearings immediately even when the oil viscosity is high so that risk of damage to or seizure of the big-end bearings is eliminated.

Further, owing to the shortness of the oil-ways and the fact that they can be made of substantial diameter, the risk of an oil-way being blocked is considerably reduced, and if two oil-ways are provided for each big-end bearing from the main journals on each side the risk of the oil supply to the big-end bearing failing is substantially eliminated.

I claim:

1. A crankshaft comprising a main journal, a crank pin or connecting rod journal, and a web connecting said main journal and said crank pin or connecting rod journal, an oil passage being formed as a straight drilling between said main journal and said crank pin or connecting rod journal so as to connect points of the journal surfaces which are on opposite sides of the common axial plane of said two journals, said drilling passing through said web.

2. A crankshaft as claimed in claim 1, a shallow recess being provided in at least one of said journals, said oil passage starting from said recess.

3. A crankshaft comprising a hollow main journal, a hollow crank pin or connecting rod journal, and a web connecting said main journal and said crank pin or connecting rod journal, an oil passage being formed as a straight drilling between said main journal and said crank pin or connecting rod journal, said drilling crossing the common axial plane of said two journals and passing through said web and laterally of the hollow spaces of said journals.

WILLIAM ARTHUR LIGHTOWLER.

REFERENCES CITED

The following references are of record in the file of this patent:

UNITED STATES PATENTS

| Number | Name | Date |
|---|---|---|
| 1,901,358 | Ryder | Mar. 14, 1933 |
| 1,257,258 | Lemp et al. | Feb. 19, 1918 |
| 1,354,852 | Schneider | Oct. 5, 1920 |
| 1,511,200 | Jerome | Oct. 7, 1924 |
| 1,872,365 | Underwood | Aug. 16, 1932 |